Jan. 4, 1944. E. M. MOREHOUSE 2,338,659
CONDUIT CLIP AND SUPPORTING BRACKET
Filed Oct. 24, 1942
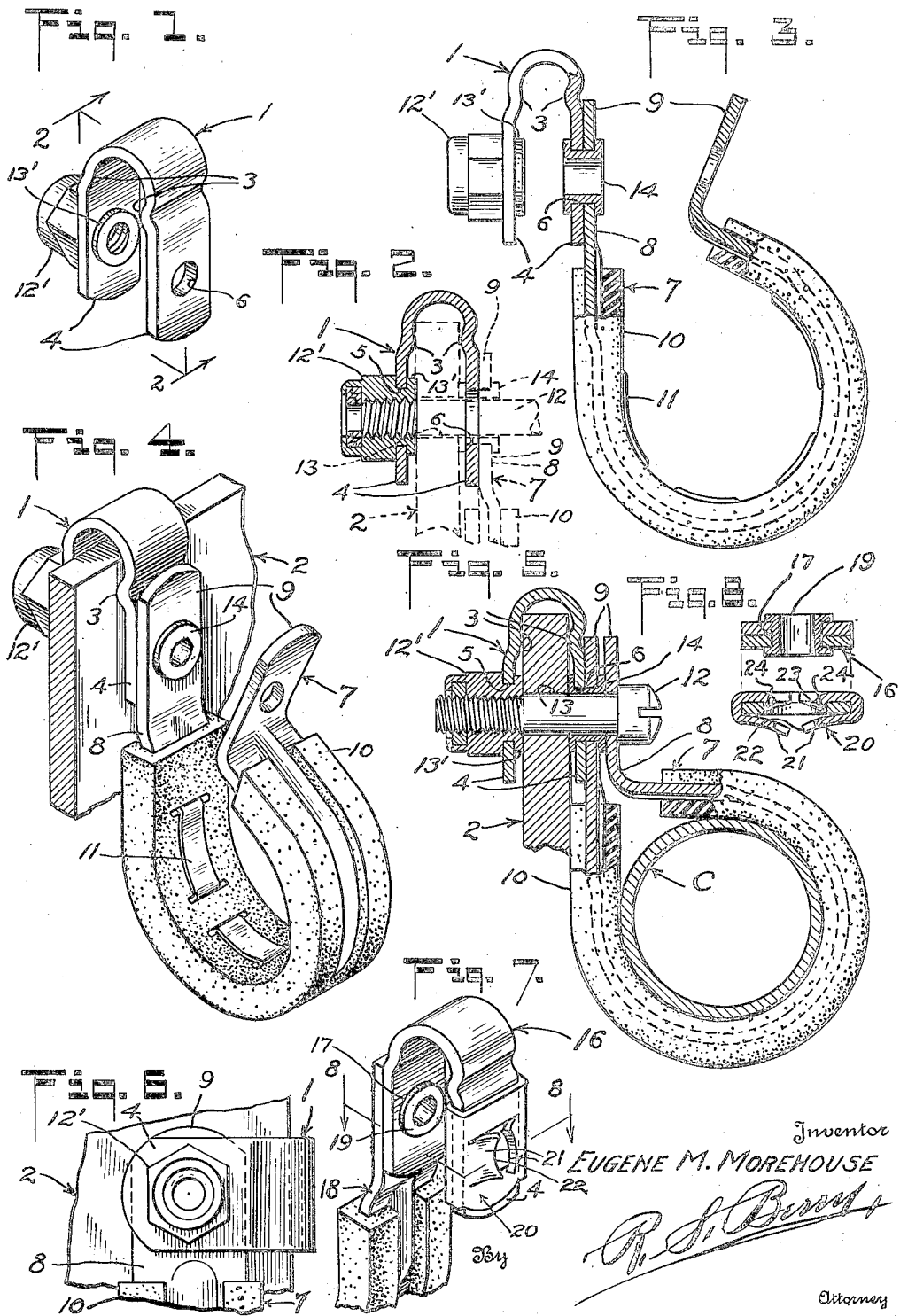
Inventor
EUGENE M. MOREHOUSE Patented Jan. 4, 1944

2,338,659

UNITED STATES PATENT OFFICE 2,338,659

CONDUIT CLIP AND SUPPORTING BRACKET

Eugene M. Morehouse, Tujunga, Calif., assignor to Adel Precision Products Corp., a corporation of California Application October 24, 1942, Serial No. 463,287

6 Claims. (Cl. 248—74)

This invention relates to clips for supporting conduit lines in aircraft wherein the clips are mounted on aircraft structural parts and in some instances support the conduits on cushioned seats and in electrically bonded or "grounded" relation to such structural parts.

The primary object of this invention is to provide an improved supporting or attaching bracket which makes it possible to mount the clips on structural parts of the aircraft much more readily and easily than heretofore and in places and on structural parts where the ordinary clip without such a bracket can only be installed with great difficulty, if at all.

Another object is to provide an attaching bracket for conduit clips, which is substantially U-shaped and subject to use as a separate element or as a clip-carried part and in either case may be readily and easily mounted so as to embrace and frictionally grip an edge of an airplane structural part. In the instance of its separate use, the bracket serves as a convenient and adjustable anchorage member to which the clip may be secured; and in the instance of its being carried as a part of the clip, it will support the clip in the desired position before and during the operation of finally bolting and clamping the clip in place.

Another object of this invention is to provide a clip mounting bracket of the character described on which a nut or the like is held in such manner as to make it unnecessary for the operator to hold the nut with one hand in position to receive the bolt, thereby saving time and labor and leaving both hands of the operator free for effecting a quicker and easier mounting of the clip.

A further object is to provide a mounting bracket and clip assembly in which the bracket is pivotally mounted on the clip to facilitate the mounting of the bracket on structural parts of various shapes and in various positions.

An important object of this invention is to provide an attaching bracket for conduit clips which will simply and render easier the operations of securing conduit lines in place in that a plurality of brackets with the clips thereon may be quickly and easily clipped and held on structural parts of the aircraft without the use of screws or bolts, to support the clips in an unclamped and open condition and in position to receive the conduit line or with the conduit loosely held therein, it being possible to pivotally swing the clips relative to the brackets after the mounting of the latter to bring the clips into positions best suited to the positions of the conduit lines, and it likewise being possible to swing the brackets into different angular positions relative to the clips before installation thereof depending on the position or angle of the structural members on which they are to be mounted. In this connection it should be noted that in sub-assembly operations wherein the clips are mounted at the proper intervals on a conduit line before the line is set in the desired position, the brackets in accordance with my invention may be quickly hooked on or clasped to the most convenient structural parts to support the line so that the operator may have the use of both hands to quickly bolt the clips and brackets in place and at the same time clamp the clips on the conduit line.

With the foregoing objects in view, together with such other objects and advantages as may subsequently appear, the invention resides in the parts and in the construction and combination and arrangement of parts hereinafter described and claimed, and illustrated by way of example in the accompanying drawing, in which:

Fig. 1 is a perspective view of a bracket embodying my invention;

Fig. 2 is a sectional view taken on the line 2—2 of Fig. 1 with a part of the clip shown in dotted lines;

Fig. 3 is a fragmentary side elevational and part sectional view of a conduit clip and bracket assembly embodying my invention, a bracket such as shown in Figs. 1 and 2 being pivotally attached to the conduit clip;

Fig. 4 is a fragmentary perspective view of the clip-bracket assembly shown in Fig. 3 as when mounted on a structural part of an aircraft before being bolted or fastened in final installation;

Fig. 5 is a part sectional, part elevational view of the clip-bracket assembly as when completely installed;

Fig. 6 is a fragmentary elevational view of the clip-bracket unit showing the pivotal bracket disposed at an adjusted position at right angles to that of Fig. 5;

Fig. 7 is a perspective view of a modified form of bracket;

Fig. 8 is a sectional view taken on line 8—8 of Fig. 7.

Referring to the drawing more specifically, I designates a U-shaped resilient metal bracket embodying my invention and which is adapted to be clipped on an edge of a structural part 2 of an aircraft as shown in Figs. 4, 5, and 6, so as to be frictionally clamped and held thereon. The frictional gripping action is enhanced by the use of transverse rib-like jaws 3 on the inner faces of opposite legs 4 of the bracket near the closed end thereof, the manner in which said jaws function being plainly shown in Figs. 4 and 5. Openings 5 and 6 are formed in the free ends of the legs 4 to provide for bolting the bracket to the structural part 2 and the attachment of a conduit clip 7 thereto.

As here shown the conduit clip 7 includes a resilient metal conduit-embracing strap 8 having apertured outwardly extended opposed ends 9. A cushion 10 of resilient insulation material is mounted on the strap as a vibration-absorbing seat for the conduit C. A metallic bonding strip 11 may be provided on the cushion and strap to ground the conduit to the airplane structure through the strap 8, as is well known in the art. The ends 9 are brought together as shown in Figs. 2 and 5 by means of a bolt 12 and a nut 12' to clamp the clip around the conduit.

The bracket 1, as shown in Figs. 1 and 2, may be used as a separate member from the clip and after being mounted on an edge of the structural part 2, as shown in Fig. 2, with its openings 5 and 6 in registration with an opening 13 in said part, is adapted for the connection of the clip therewith by means of the bolt 12 and nut 12' which hold the bracket in place and clamp the clip on the conduit.

As here provided the nut 12' is permanently attached to the bracket 1 as by being riveted thereto as at 13' through the opening 5 in one of the legs 4, whereby the operator is not required to hold the nut in place to receive the bolt and therefore has the use of both hands in completing the installation of the clip and bracket.

Where the bracket is fixed to the clip as a part thereof it is preferably pivoted to one of the ends 9 of the clip as by use of a hollow rivet 14 as best shown in Fig. 3. This is an advantageous arrangement as it facilitates sub-assembly and other installation operations in providing for the supporting of the clips while open or with the conduits supported therein on the desired structural part of the airplane and in the desired position before completing the installation operation and without requiring the use of nuts and bolts or other fastenings, since the bracket may be readily and easily clipped and frictionally held on edges of such structural parts regardless of the angle or position of such parts due to the provision for relatively pivotally adjusting the bracket and the clip.

Moreover, after the clip and bracket are positioned as shown in Fig. 4, the completion of the fastening operation is greatly facilitated inasmuch as the operator need but install the bolt 12 and has the use of both hands due to the nut 12' being carried by the bracket at all times in proper position to be threadedly engaged with the bolt.

On screwing in the bolt the ends 9 of the clip will be brought together to properly clamp the clip on the conduit and secure the bracket on the structural part of the aircraft. Fig. 6 shows one of the many pivotal adjustments of the bracket which may be resorted to depending on the position and extent of the structural part on which the bracket is mounted.

Figs. 7 and 8 show a modified form of the bracket of this invention wherein the U-shaped bracket 16 is identical to the bracket 1 and is in this instance pivoted as at 17 to one of the ends of the clip 18 by means of a hollow rivet 19. In this form of the invention a sheet metal nut 20 is clipped around the bracket and has opposed spring jaws 21 adapted to be threadedly engaged with a bolt, not shown, there being registering bolt holes 22 and 23 in the nut 20 and bracket 16 respectively which holes are aligned with the hole through the rivet 19. The advantage of this arrangement is that the nut 20 is smaller and of less weight than the conventional type of nut. The nut 20 has small tongues 24 which extend into the opening 23 in the bracket to hold the nut in place on the bracket.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a conduit clip, a conduit-embracing strap having apertured ends, and a U-shaped bracket adapted to be mounted on a support and having openings in its end portions adapted to align with the apertures in the ends of the strap and fastening means including a bolt extended through said apertures and said openings and operable to clamp the strap on a conduit as well as clamp the bracket on said support.

2. In a conduit clip, a conduit-embracing strap having apertured ends, a U-shaped bracket adapted to be clamped on a support having openings in its end portions adapted to align with the apertures in the ends of the strap and fastening means including a bolt extended through said apertures and said openings and operable for clamping both the strap and the bracket in place, and means for securing the bracket to one of the ends of the strap.

3. In a conduit clip, a conduit-embracing strap having apertured ends, a U-shaped bracket having openings in its end portions adapted to align with the apertures in the ends of the strap so that a bolt may be extended through said apertures and said openings, and means for pivotally securing the bracket to one of the ends of the strap.

4. In a conduit clip, a conduit-embracing strap having apertured ends, a U-shaped bracket having openings in its end portions adapted to align with the apertures in the ends of the strap so that a bolt may be extended through said apertures and said openings, a hollow rivet passing through the aperture of one of the ends of the strap and one of the openings in the bracket and pivotally securing the bracket on the strap.

5. In a conduit clip, a conduit-embracing strap having apertured ends, a U-shaped bracket having openings in its end portions adapted to align with the apertures in the ends of the strap, means for securing one of the end portions of the bracket to one of the ends of the strap, a nut fixed on the other end portion of the bracket and registering with the opening therein, and a bolt extended through said apertures and openings and cooperating with said nut to clamp the bracket on a support as well as clamp the strap around a conduit.

6. In a conduit clip, a conduit-embracing strap having opposed apertured ends, a bracket adapted to embrace a structural part on which the clip is supported, having openings in its end portions adapted to register with the apertures in said ends, means for securing one end portion of said bracket to an end of the strap, including a hollow rivet providing a pivotal connection between the bracket and the strap, fastening means including a nut fixed on the other end portion of said bracket and a bolt extended through said apertured ends, said openings, said hollow rivet and said nut and operable for clamping the bracket on said structural part as well as for clamping the strap around a conduit.

EUGENE M. MOREHOUSE.